D. DALZELL.
Thill-Coupling.
No. 210,092. Patented Nov. 19, 1878.
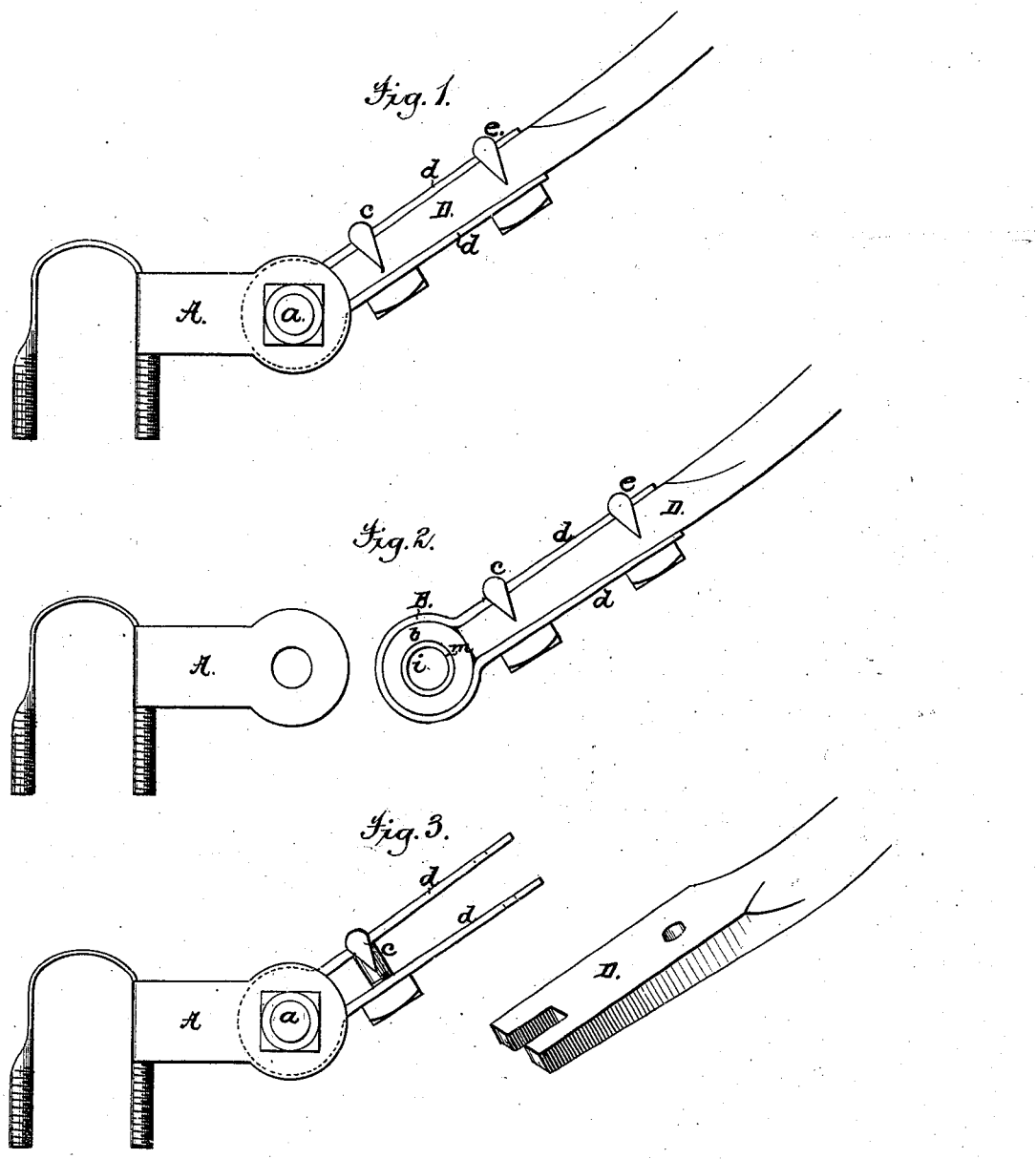

UNITED STATES PATENT OFFICE.

DAVID DALZELL, OF SOUTH EGREMONT, MASSACHUSETTS.

IMPROVEMENT IN THILL-COUPLINGS.

Specification forming part of Letters Patent No. 210,092, dated November 19, 1878; application filed October 2, 1878.

*To all whom it may concern:*

Be it known that I, DAVID DALZELL, of South Egremont, in the county of Berkshire and State of Massachusetts, have invented a new and useful Improvement in Shaft and Pole Couplings; and I do hereby declare that the following is a full, clear, and exact description thereof, reference being had to the accompanying drawing, forming a part of this specification, in which—

Figure 1 is a side elevation; Fig. 2, a view, showing the parts disconnected in the manner heretofore practiced; Fig. 3, a view of the parts disconnected according to my improvement; and Fig. 4, a sectional view of the elastic packing-sleeve and yielding bushing.

Similar letters of reference indicate corresponding parts in the several figures.

This invention relates to couplings in which an elastic packing is arranged within the eye of the shaft or pole iron, and through which a bolt is passed to connect the same to the fixed jack upon the axle. These parts form the working-joint between the shafts or pole and the vehicle; and the object of my invention is to connect or detach the pole or shafts without separating or disturbing such working-joint; and to this end my invention consists, first, in forming a rigid coupling, of which said working-joint forms a separable part, upon the shank of the pole or shaft iron; and second, in a novel construction of the confined elastic packing.

In order that others may understand and use my invention, I will first proceed to describe a device embodying the same, and to subsequently point out in the annexed claims its novel features.

In the drawing, A represents an ordinary jack or shackle, permanently attached to the axle, and provided with the usual transverse connecting-bolt *a*.

The detachable eye of the shaft-iron is composed of the curved strap B, the packing-sleeve *b*, and vertical clamping-bolt *c*, the projecting flanges *d d* of the strap B forming a socket to receive the shank D of the shaft or pole iron, which rests against the packing-sleeve, and is secured within the strap by the vertical bolt *e*, this connection forming a rigid coupling between the shafts or pole and the vehicle, leaving the parts forming the working-joint attached to the jack or shackle and undisturbed.

The end of the shank D is slotted, as shown in Fig. 3, to allow it to pass the clamping bolt *c*, and which serves in this construction to resist a lateral strain.

The elastic or yielding packing-sleeve *b*, through which the transverse bolt *a* is passed, is provided with a bushing, *i*, which forms a prominent feature of this invention, and at the same time may be employed with equal advantage in the couplings adapted to use such a form of packing.

This bushing may be made from any suitable material; but in this instance I have adopted a material known as "vulcanized paper," and which I have found to be a serviceable substance. The bushing is slotted its entire length, as shown at *m*, to permit a contraction as it wears upon the bolt *a* by the compressing action of the elastic packing or clamping-bolt *c*, and thus all lost motion is constantly taken up and consequent rattling avoided.

Having thus fully described my invention, what I claim, and desire to secure by Letters Patent, is—

1. A shaft or pole coupling attachment for vehicles, consisting of a jack or shackle, A, a connected eye part, B, having the projecting flanges *d d*, an interposed elastic packing, *b*, and the detachable shank-iron D, arranged within the flanges *d d* and bearing upon the elastic packing *b*, substantially as described.

2. An elastic cylindrical packing, *b*, provided with a slotted and compressible bushing, *i*, substantially as set forth.

DAVID DALZELL.

Witnesses:
ROSCOE C. TAFT,
JOHN VAN DEUSEN.